(No Model.)
R. T. SMITH.
STREET RAILWAY SWITCHING DEVICE.
No. 459,418. Patented Sept. 15, 1891.
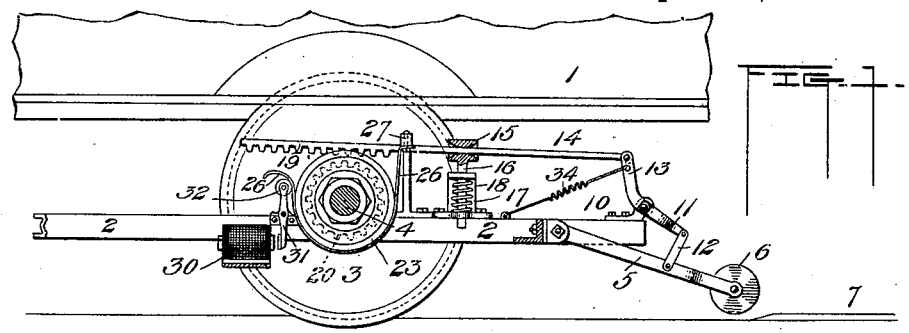
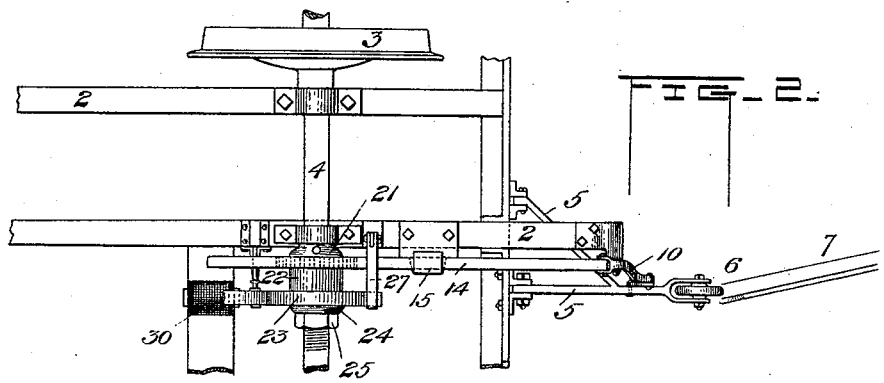
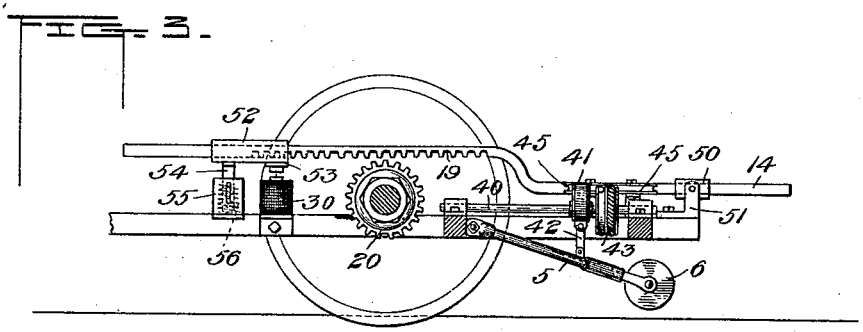
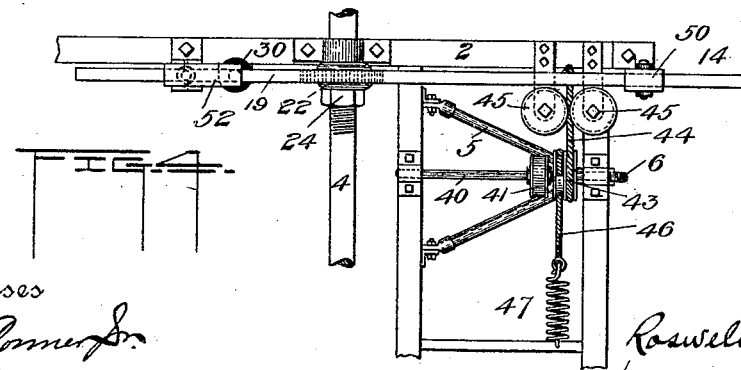
Witnesses
L. A. Conner Jr.
E. A. Greeley
Inventor
Roswell T. Smith
by
William B. Greeley
Attorney

UNITED STATES PATENT OFFICE.

ROSWELL T. SMITH, OF NASHUA, NEW HAMPSHIRE.

STREET-RAILWAY SWITCHING DEVICE.

SPECIFICATION forming part of Letters Patent No. 459,418, dated September 15, 1891.

Application filed January 24, 1891. Serial No. 378,968. (No model.)

*To all whom it may concern:*

Be it known that I, ROSWELL T. SMITH, of Nashua, in the county of Hillsborough and State of New Hampshire, have invented certain new and useful Improvements in Street-Railway Switching Devices, of which the following is a specification.

My invention relates to switching devices of the class of that shown and described in my patent, No. 433,547, issued August 5, 1890, wherein the car is crowded from the main track to the turn-out, as it advances, by the engagement of a guide-wheel carried by the car with a fixed rail.

The special object of the present invention is to improve the means for moving the guide-wheel into or out of position to engage with the fixed guide-rail.

In the drawings, Figure 1 is a sectional side view of a portion of a car with its truck-frame having one form of my improved device applied thereto. Fig. 2 is a plan view of the same, omitting the portion of the car-body; and Figs. 3 and 4 are similar views showing a different form of the device.

The car-body 1, truck-frame 2, wheels 3, axle 4, movable bracket 5, supported by the truck-frame and carrying the guide-wheel 6, adapted to be lowered to engage the guide-rail 7, are and may be substantially as shown in my said patent.

In the construction presented in Figs. 1 and 2, a lever 10 is pivoted upon the truck-frame and has one arm 11 connected with the movable bracket 5 by a link 12. To the arm 13 is connected one end of a longitudinally-movable bar 14. In order that the bar may also be free to move somewhat in a vertical plane the guideway 15 in which it slides is carried by a plunger 16, which moves freely in a bracket 18 on the truck-frame. A spring 17 holds the plunger and bar in normal position. The bar is adapted to be moved longitudinally by a wheel 20 on the axle 4, and to insure this movement both bar and wheel may be toothed, as indicated at 19. The wheel 20 is mounted frictionally on the axle between collars 21 22, so that it may cease to rotate with the axle when the bar 14 has moved to its limit. Normally the bar 14 is not in contact with the wheel 20, but must be brought into contact therewith when it is desired to lower the guide-wheel 6. The means for accomplishing this are preferably such as are shown in Figs. 1 and 2. A second wheel 23 is also mounted frictionally on the axle between the collar 22 and a collar 24. The collars and wheels are pressed together with the desired force by a nut 25 on the axle. A strap 26, attached to a pivoted bar 27, which overlies the bar 14, is passed loosely about the wheel 23. An electro-magnet 30 is mounted on the truck-frame conveniently near the axle, and upon one end of its pivoted armature 31 is carried an idler 32, which is adapted, when the armature is moved, to press the strap 26 against the wheel 23 and increase the friction between them sufficiently to cause the strap to draw the bar 14 into contact with the wheel 20 against the resistance of the spring 17. The magnet 30 is in a circuit, under control from some convenient point of the car, and not necessary to be shown herein.

The operation of the device described above is obvious. As the car approaches a turn-out the magnet is energized and the bar 14 is brought into contact with the wheel 20 and thrust forward, thereby transmitting its movement through the lever 10 and link 12 to the movable bracket 5. The bracket 5 may be restored to normal position by a spring 34.

In Figs. 3 and 4 are shown a different form of the connection between the bar 14 and the movable bracket 5, and a different form of the device for bringing the bar 14 into contact with the wheel 20. The movable bracket 5, the bar 14, and the wheel 20 are all substantially as shown in Figs. 1 and 2. A shaft 40, journaled longitudinally on the truck-frame, carries an eccentric and strap 41, which is connected by a link 42 with the movable bracket 5. The shaft also carries a drum 43, to which is attached a cord or chain 44, led between guide-pulleys 45 and secured to the bar 14. A second cord 46 is secured to the drum and passed about it in the opposite direction and is attached to a spring 47. Movement of the bar 14 longitudinally will draw upon the cord 44, which will rotate the eccentric and cause the wheel 6 to be depressed. As soon as the bar is released the spring 47 will cause the rotation of the eccentric to be reversed and the wheel 6 to be raised to its normal position. The bar 14 slides in a pivoted guide 50, which is supported by a bracket 51 on the truck-frame, and in a vertically-movable guide 52, which forms or bears the armature 53 of the magnet 30. The guide is held in normal position by a plunger 54, moving in a bracket 55, and a spring 56. When the magnet is energized, the guide 52 is attracted and the bar 14 is brought into engagement with the wheel 20 to be moved thereby.

In practice the mechanism of the devices shown will be housed in, that it may be protected from ice, dirt, &c., but such housing has been omitted from the drawings to avoid confusion.

I claim—

1. The combination of the truck-frame, a movable bracket carrying a guide-wheel and supported by said frame, a lever pivotally mounted on said frame, a link connecting said lever and bracket, a longitudinally-movable bar connected to said lever and supported by said frame, and means also supported by said frame to move said bar, substantially as described.

2. The combination of a movable bracket carrying a guide-wheel, a longitudinally-movable bar, connections between said bar and bracket to transmit the movement of the former to the latter, a rotating wheel, and means to bring said bar into contact with said wheel, substantially as described.

3. The combination of a movable bracket carrying a guide-wheel, a longitudinally-movable bar, connections between said bar and bracket to transmit the movement of the former to the latter, a rotating wheel, a magnet, and means actuated by said magnet to bring said bar into contact with said wheel, substantially as described.

4. The combination of a movable bracket carrying a guide-wheel, a longitudinally-movable bar, connections between said bar and bracket to transmit the movement of the former to the latter, a rotating wheel, means to bring said bar into contact with said wheel, said means consisting of a second rotating wheel, a bar overlying said first-named bar, a strap connected thereto and passed loosely about said last-named wheel, and an electro-magnet and its armature adapted to press said strap against said wheel, substantially as described.

5. The combination of a car-truck, a movable bracket carrying a guide-wheel, a wheel on the axle of said truck, means intermediate said wheel and bracket to move the latter from the former, and a device to control the engagement of said means with said wheel, substantially as described.

In witness whereof I have hereunto set my hand.

ROSWELL T. SMITH.

Witnesses:
W. H. LOVEJOY,
ALICE L. INGALLS.